United States Patent [19]
Gotham, Sr. et al.

[11] Patent Number: 5,938,163
[45] Date of Patent: Aug. 17, 1999

[54] ARTICULATING TOUCHSCREEN INTERFACE

[75] Inventors: David R. Gotham, Sr., Rochester; Timothy J. White, Webster; Guy E. Martin, Rochester, all of N.Y.

[73] Assignee: Eastman Kodak Company, Rochester, N.Y.

[21] Appl. No.: 08/954,526

[22] Filed: Oct. 20, 1997

[51] Int. Cl.⁶ .................................................. A47G 29/00

[52] U.S. Cl. ........................................... 248/371; 248/919

[58] Field of Search .............................. 248/278.1, 285.1, 248/286.1, 371, 349.1, 919, 920, 921, 922, 923

[56] References Cited

U.S. PATENT DOCUMENTS

| | | | |
|---|---|---|---|
| 4,648,574 | 3/1987 | Granlund | 248/920 |
| 4,834,329 | 5/1989 | Delapp | 248/923 |
| 5,108,062 | 4/1992 | Detwiler | 248/923 |
| 5,263,678 | 11/1993 | Birkbeck | 248/657 |
| 5,335,142 | 8/1994 | Anderson | 248/921 |
| 5,488,453 | 1/1996 | Labudde et al. | 248/920 |

*Primary Examiner*—Ramon O. Ramirez
*Assistant Examiner*—Robert Lipcsik
*Attorney, Agent, or Firm*—Lawrence P. Kessler

[57] ABSTRACT

An articulating interface for a machine has an interface support positioned on the machine for mounting a control console. The interface support is movable in a plurality of directions to orient the control console in a plurality of selectable orientations to provide greater ease of use for diverse users. The interface support may be moved longitudinally, may be tilted, and may be swivelled.

4 Claims, 6 Drawing Sheets

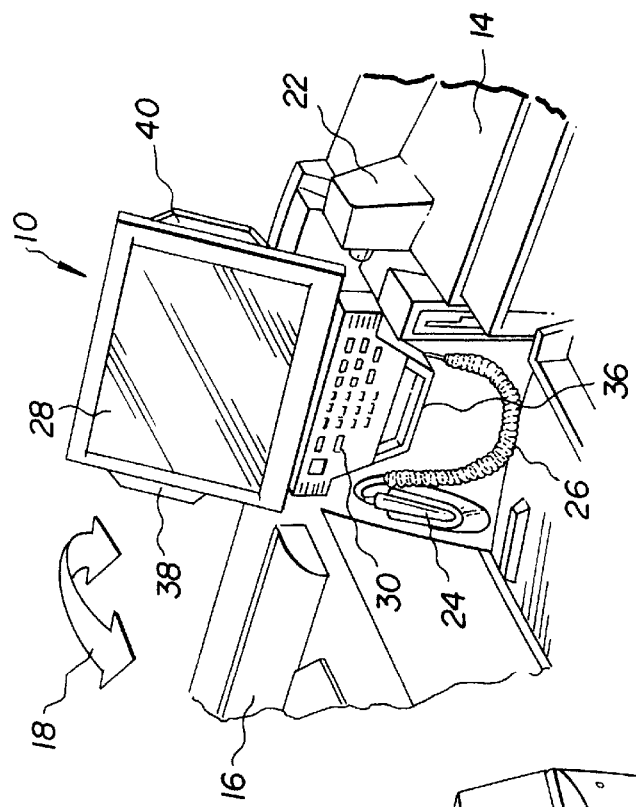
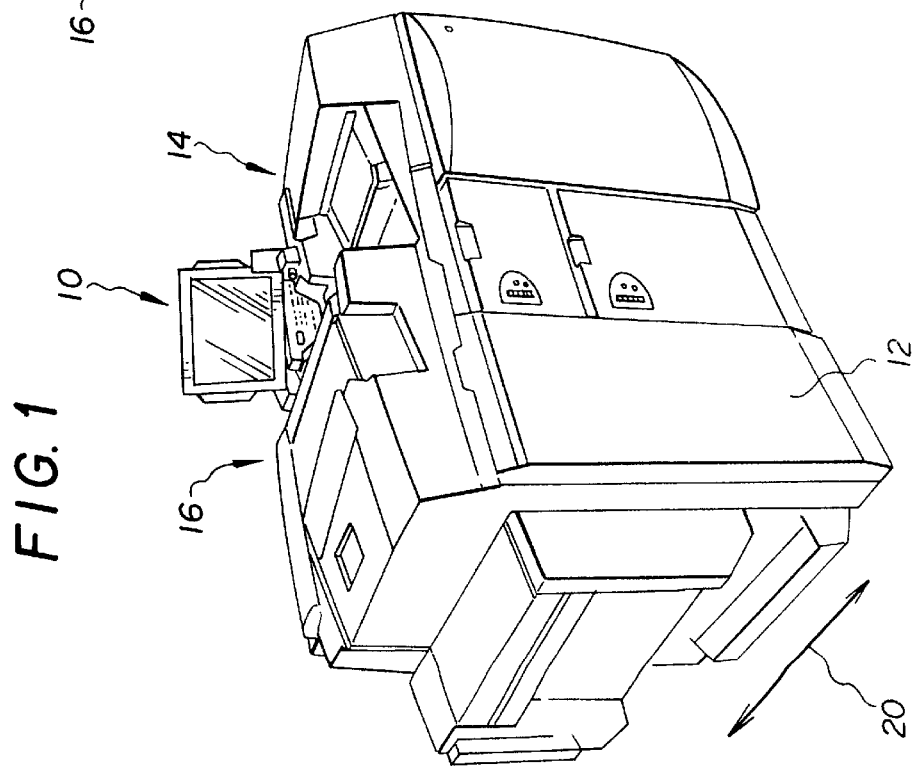

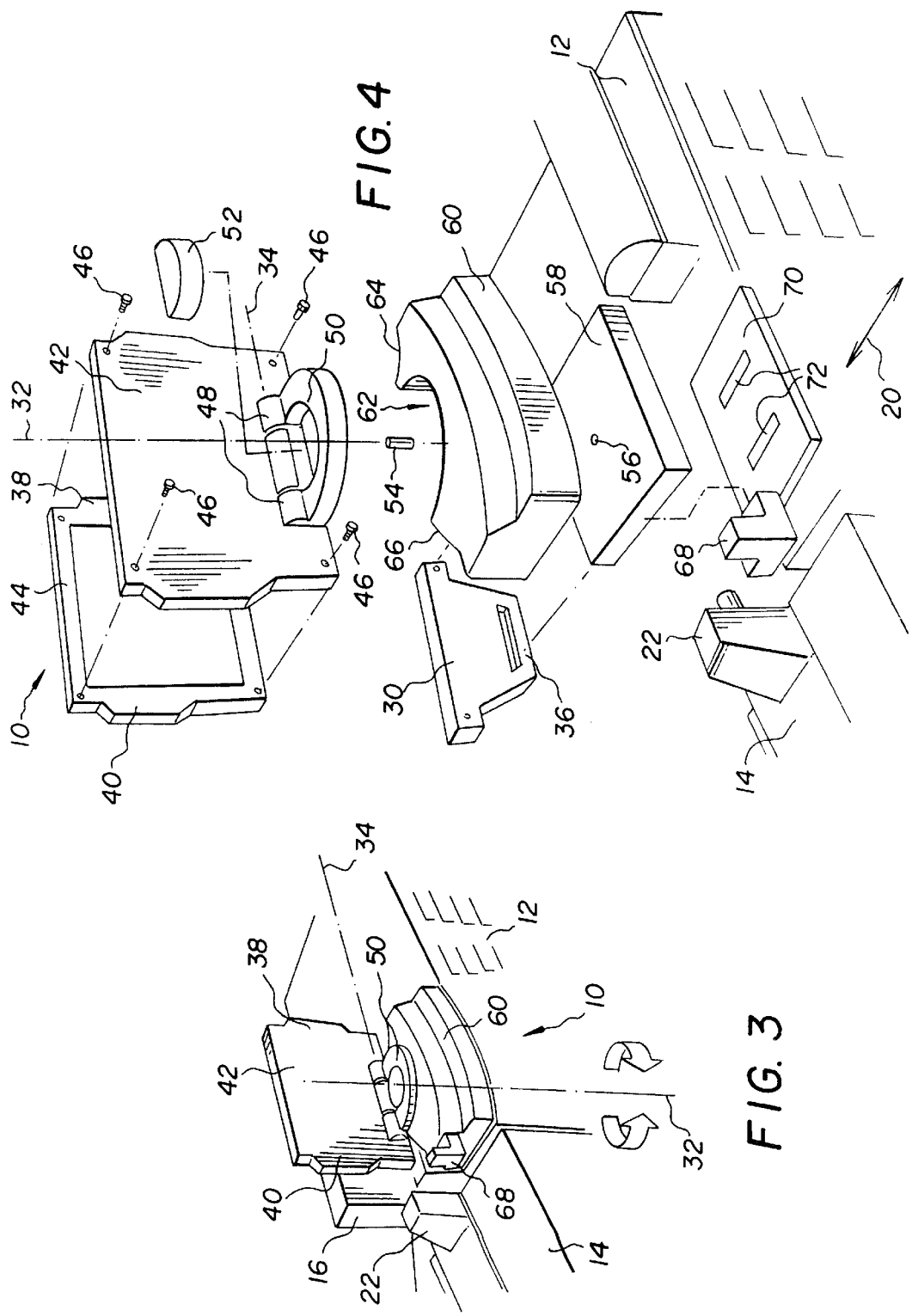

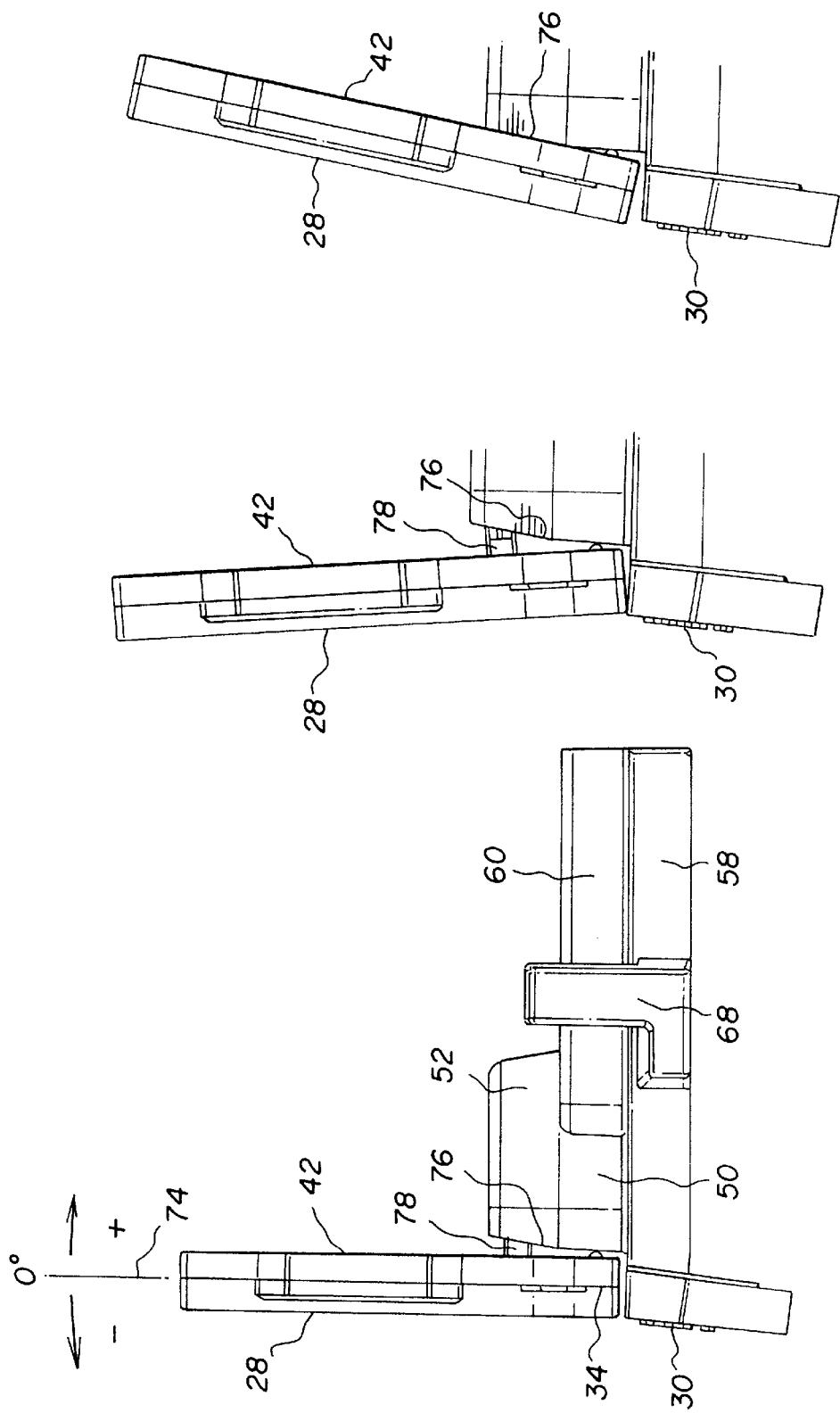

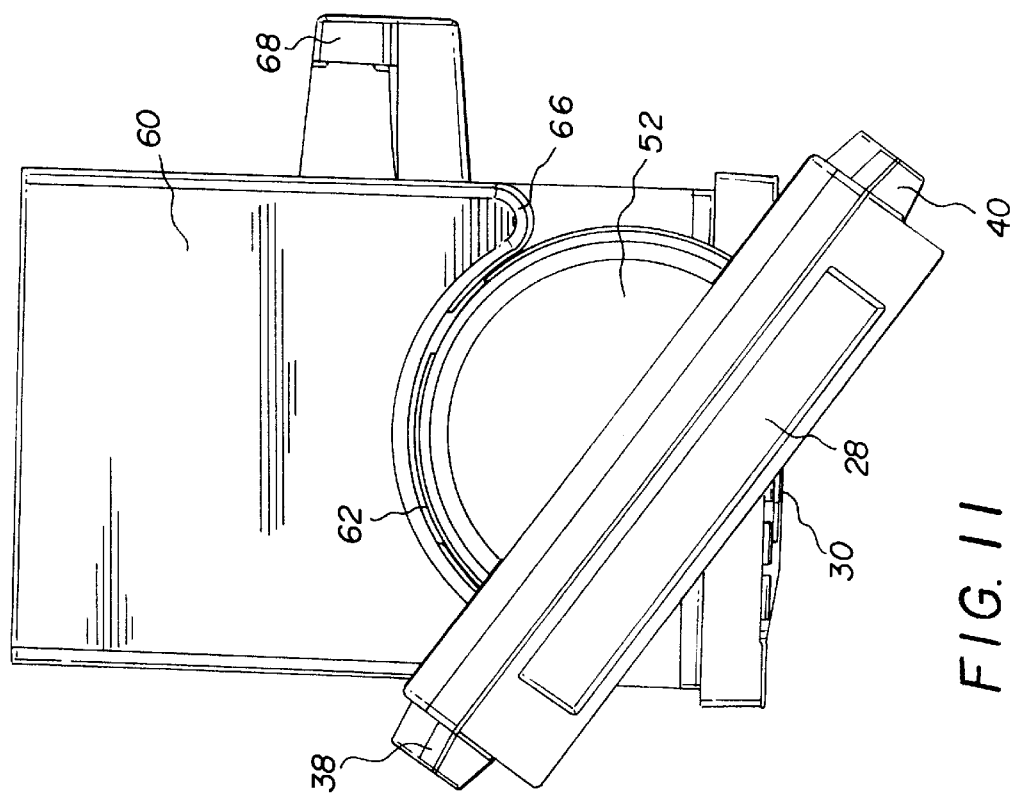
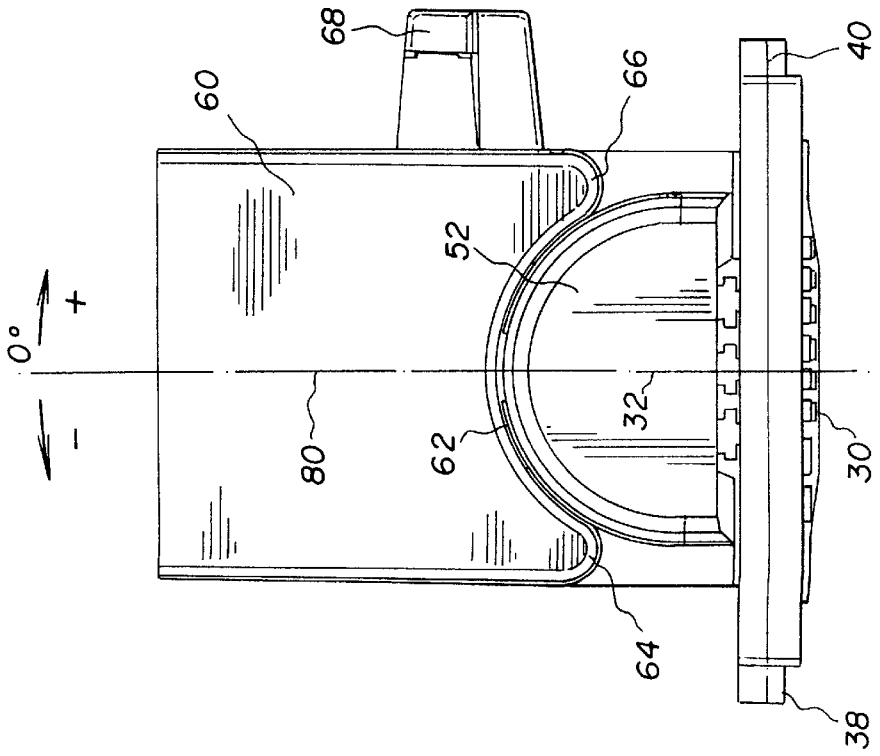

ARTICULATING TOUCHSCREEN INTERFACE

CROSS REFERENCE TO RELATED APPLICATIONS

1. Field of the Invention

This disclosure relates generally to the field of electronic interfaces, and in particular to articulating interfaces for machine operations.

2. Background of the Invention

Input/output interfaces such as monitor and control consoles are generally mounted on or substantially adjacent to a machine so that an operator may directly control the operation of the machine. For example, users of photocopy machines or copiers typically access an operator's console attached to or built into the copiers. The console may be positioned at a frontal area of the copier so that users may stand over the console and input operating instructions directly. For economic purposes, the consoles may be relatively small and compact, which require the user to confine manual movements to within a narrow range of motion.

Alternatively, the console may be positioned at a rear portion of the copier, requiring the user to reach over a portion of the copier during operations.

Generally, such consoles are fixed in a predetermined position and orientation on the machine such as a copier, and so consoles are not oriented to provide ease of use for each specific user. More often, such fixed consoles are uncomfortable to use and may result in inefficient operation of the copier.

Accordingly, a need exists for a machine interface which may be oriented in customized positions to provide ease of use in the operation of the machine.

SUMMARY OF THE INVENTION

It is recognized herein that an articulating interface provides greater ease of use in operating a machine, such as a copier.

An articulating interface for a machine is disclosed which has an interface support positioned on the machine for mounting a control console. The interface support is movable in a plurality of directions to orient the control console in a plurality of selectable orientations to provide greater ease of use for diverse users. The interface support may be moved longitudinally, may be tilted, and may be swivelled.

BRIEF DESCRIPTION OF THE DRAWINGS

The features of the present invention will become readily apparent and are to be understood by referring to the following detailed description of the preferred embodiments of the present invention, taken in conjunction with the accompanying drawings, in which:

FIG. 1 is a perspective front view of the articulating interface disposed on a copier;

FIG. 2 is a perspective front view of the interface of FIG. 1 in greater detail;

FIG. 3 is a perspective rear view of the interface of FIG. 1 in greater detail;

FIG. 4 is a perspective rear view of the interface of FIG. 3 with parts separated;

FIGS. 5–7 are side plan views of the interface;

FIG. 8 is a top plan view of the interface;

FIG. 11 is a top plan view of the interface oriented as in FIG. 10; and

DETAILED DESCRIPTION OF THE INVENTION

Figure 10:
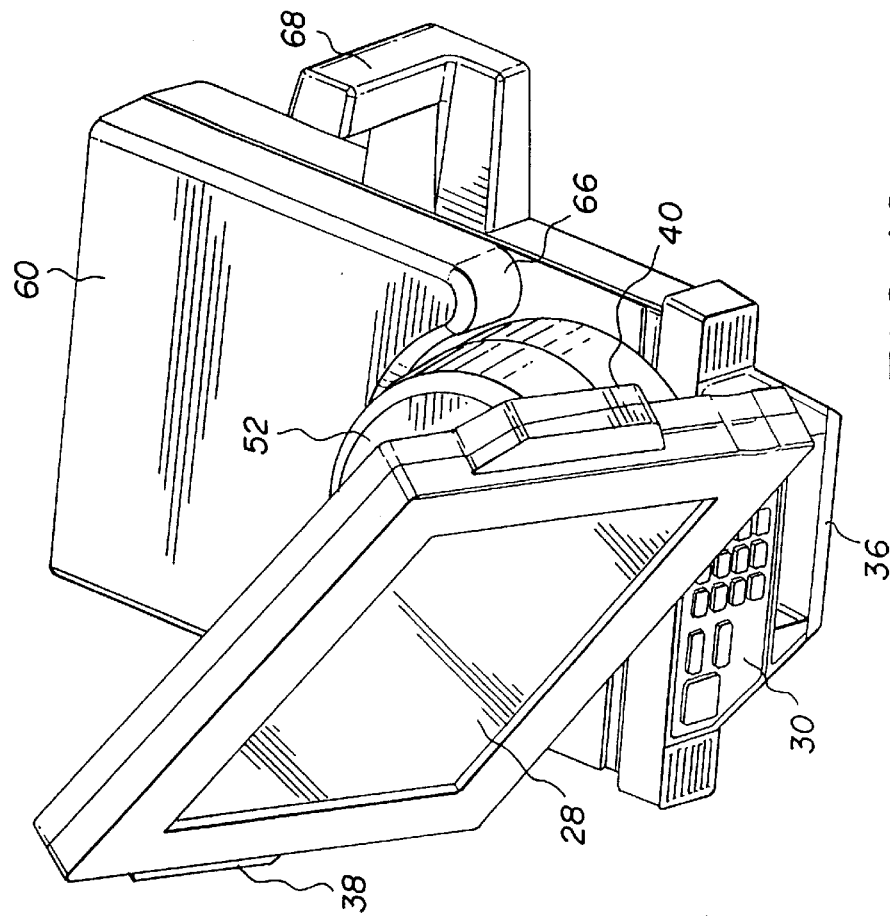
FIG. 10 is a top side perspective view of the interface in another swivelled and tilted orientation.

Referring in specific detail to the drawings, with common reference numbers identifying similar or identical elements, steps, and features, as shown in FIGS. 1–3, the present disclosure describes an articulating interface 10 for use with a machine, such as a copier 12. The interface 10 is mounted, for example, on a top surface 14 of the copier 12. Alternatively, the interface 10 may be mounted on a movable and/or articulating arm attached to the copier 12.

As shown in FIGS. 1–2, the copier 12 may include a section 16 such as an automatic feeder which pivots along the direction of the arrow 18, for example, to expose a transparent plate for copying. The interface 10 attached to the top surface 14 is securely mounted thereto may not be mounted on the section 16. The interface 10 is also slidable along the direction of the arrow 20 toward and away from a front side of the copier 12, as described below, to be positioned in customized orientations of the interface 10 for ease of use by each user. To protect the interface 10 from contacting the section 16 and/or from being damaged by movement of the section 16 during the pivoting, the copier 12 and/or the interface 10 may include a stop 22, described below. The stop 22 limits the range of movement of the interface 10 and so protects the interface 10 from contact and/or damage from the section 16 during use, such as during pivoting to expose the transparent plate for copying operations.

The interface 10 may also include or support a control console having various input and/or output devices for operation of the copier 12. For example, as shown in FIG. 2, a stylus 24 may be operatively connected to the interface 10 by a cable 26. For example, the stylus 24 may be a light pen, with the cable 26 being a fiber optic or an electrical wire for communicating signals with the interface 10 and/or a screen 28 thereof, which may be a light-sensitive screen for data input and output. Alternatively, the stylus 24 may be an inert element such as a rod for use with the screen 28, which may be a touchscreen; that is, a pressure-sensitive, proximity-sensitive, or magnetically-sensitive screen. For a magnetically-sensitive screen, the stylus 24 may include a metallized end or other materials for magnetically coupling with a region of the magnetically-sensitive screen.

The interface 10 may also include an keypad 30, which may be a set of predetermined buttons, or alternatively a QWERTY keyboard, for use in conjunction with the screen 28 of the interface 10 and/or the stylus 24. In an alternative embodiment, the stylus 24 may be replaced with a mouse or other graphic user interface (GUI) input/output devices, and the interface 10 may display and use a GUI for operating the copier 12.

As shown in FIGS. 1–3, the interface 10 may rotate about an first axis 32 for swivel or yaw orientations, and may rotate about a second axis 34 for tilt or pitch orientations. In the preferred embodiment, the screen 28 of the interface 10 is tilted by pivoting about the first axis 32. In this manner, the interface 10 and/or the screen 28 thereof may be oriented in a plurality of directions, as shown for example in FIGS. 1–2, which may be selected by the user to a customized orientation for ease of use of the interface 10 as well as the screen 28 and the keypad 30 thereof, and thus for ease of use of the copier 12.

In a preferred embodiment, the interface 10 includes elements to facilitate grasping and handling the interface 10 and/or the screen 28 by the user for manually re-orienting the interface 10 and/or the screen 28. For example, the interface 10 may include a lower handle 36 for longitudinally sliding the interface 10 along the direction of the arrow 20.

The interface 10 may also include lateral handles 38, 40 positioned on both sides of the screen 28 to permit a user to tilt the screen 28 by pivoting the screen 28 about the second axis 34, and also to permit the user to swivel the screen 28 by pivoting the screen about the first axis 32. Alternatively, a handle may be positioned at the top of the screen 28 to facilitate tilting.

In alternative embodiments, the user may physically grasp, push, and/or pull the interface 10 to re-orient the interface 10 and/or the screen 28.

As shown in FIGS. 3–4, the interface 10 includes a back panel 42 and a frame 44 which are secured, for example, by screws 46 for mounting the screen 28 therebetween. The back panel 42 includes flanges 48 which are attached to a tilt base 50 in a hinge engagement to permit the screen 28 to tilt about the second axis 34. An optional cap 52 may be positioned on the tilt base 50 to cover the hinge engagement, for example, to limit the degree of tilting, as described below, or to protect the hinge engagement from dust or other particulate, such as copier toner.

In the preferred embodiment, the tilt base 50 is pivotally mounted on a peg 54 positioned in a mounting hole 56 in a platform 58. The peg 54 is substantially aligned with the first axis 32 and serves as an axle, so that the tilt base 50 may rotate about the first axis 32 for swivel orientations.

A back cover 60 is mounted to the platform 58, and has a central curved region 62 in which the tilt base 50 and/or the cap 52 are positioned. The central curved region 62 may have a smooth circular surface for slidably engaging a complementary smooth circular surface of the tilt base 50 and/or the cap 52, as shown in FIGS. 8 and 11, described below. The back cover 60 may also include side surfaces 64, 66 which limit the range of swiveling of the back panel 42.

The keypad 30 is attached to the platform 58, with electrical connections (not shown in FIG. 4) running through apertures in the platform 58 to the screen 28, or alternatively running directly to the screen 28 for exchanging data signals to operate the copier 12. Other electrical connections to the screen 28 and/or the keypad 30 such as power connections are provided, with such electrical connections being configured in a manner to avoid their interfering with the tilt and swivel movement of the interface 10 and the screen 28 as well to avoid interfering with the sliding motion of the platform 58.

A return arm 68 is mounted to or integral with the platform 58, such that the stop 22 limits the motion of the platform 58 toward the front of the copier 12. The return arm 68 performs as a fail-safe mechanism to prevent the interface 10 from extending over movable portions of the copier 12, such as the section 16. In this manner, the return arm 68 protects the interface 10 from contact and/or damage from the section 16 during use, such as during pivoting of the section 16 to expose the transparent plate for copying operations.

The platform 58 is slidably positioned in longitudinal directions on a slide table 70 which is affixed to or integral with the housing of the copier 12, and in particular with portions of the copier 12 which are immobile relative to the section 16 of the copier 12. The sliding engagement between the platform 58 and the slide table 70 may be implemented using known slide mechanisms, for example, a plurality of tracks 72. Thus, the slide table 70 defines a predetermined path for movement of the platform 58. Alternatively, ball bearing assemblies may be used for reducing the friction in the sliding of the platform 58 relative to the slide table 70.

Accordingly, the platform 58, being slidable in the direction of the arrow 20 in a range of positions on the top surface of the copier 12, allows the screen 28 to be oriented in a variety of positions customizable by the user. By sliding the platform 58 in conjunction with the swivel and tilt orientations of the screen 28, the user has great flexibility in orienting the interface 10 with the screen 28 and keypad 30 thereof for enhanced ease of use.

As shown in FIG. 5, an angle of tilt may be measured with respect to a 0° tilt plane 74 passing through the second axis 34, such that positive angles measure the degree of backward tilt of the screen 28 and negative angles measure the degree of forward tilt. For example, as shown in FIG. 6, the screen 28 is tilted at an angle of about −5°, while the screen 28 shown in FIG. 7 is tilted at an angle of about 10°. The cap 52 and optionally a portion of the tilt base 50 adjacent to the back panel 42 may have a sloped surface 76, shown in FIGS. 5–7, to accommodate the screen 28 tilted backward, as illustrated in FIG. 7, and so to limit the backward tilt of the screen 28.

As shown in FIGS. 5–7, at least one guide 78 may be attached, and alternatively pivotally attached, to the back panel 42 and positioned within the cap 52 to facilitate the tilting thereof, and to alleviate any stress on the hinge arrangement between the screen 28 and the tilt base 50.

Figure 9:
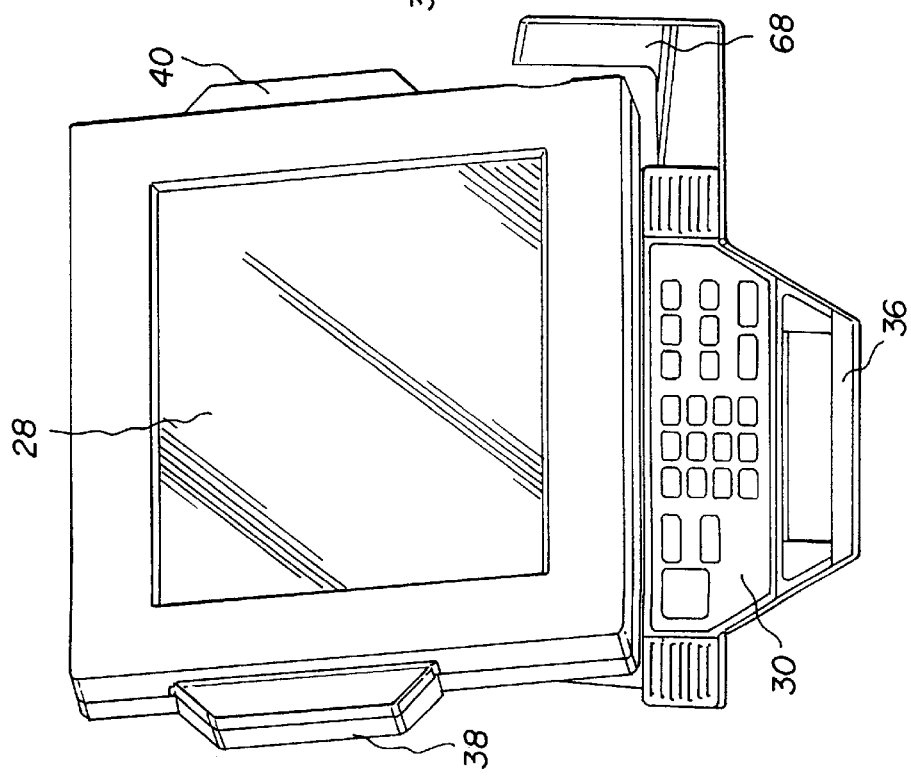
FIG. 9 is a front plan view of the interface in a swivelled and tilted orientation.

As shown in FIG. 8, an angle of swivel may be measured with respect to a 0° swivel plane 80 passing through the first axis 32, such that positive angles measure the degree of swivel to orient the screen 28 rightward with respect to a user facing the screen 28, and negative angles measure the degree of swivel to orient the screen 28 leftward of the user facing the screen 28. For example, as shown in FIG. 9, the screen 28 is tilted at an angle of about 10° and is swivelled at an angle of about 35°; that is, the screen 28 is oriented to face up and right. As shown in FIGS. 10–11, the screen 28 is tilted at an angle of about 10° and is swiveled at an angle of about −35°; that is, the screen 28 is oriented to face up and left.

Figure 12:
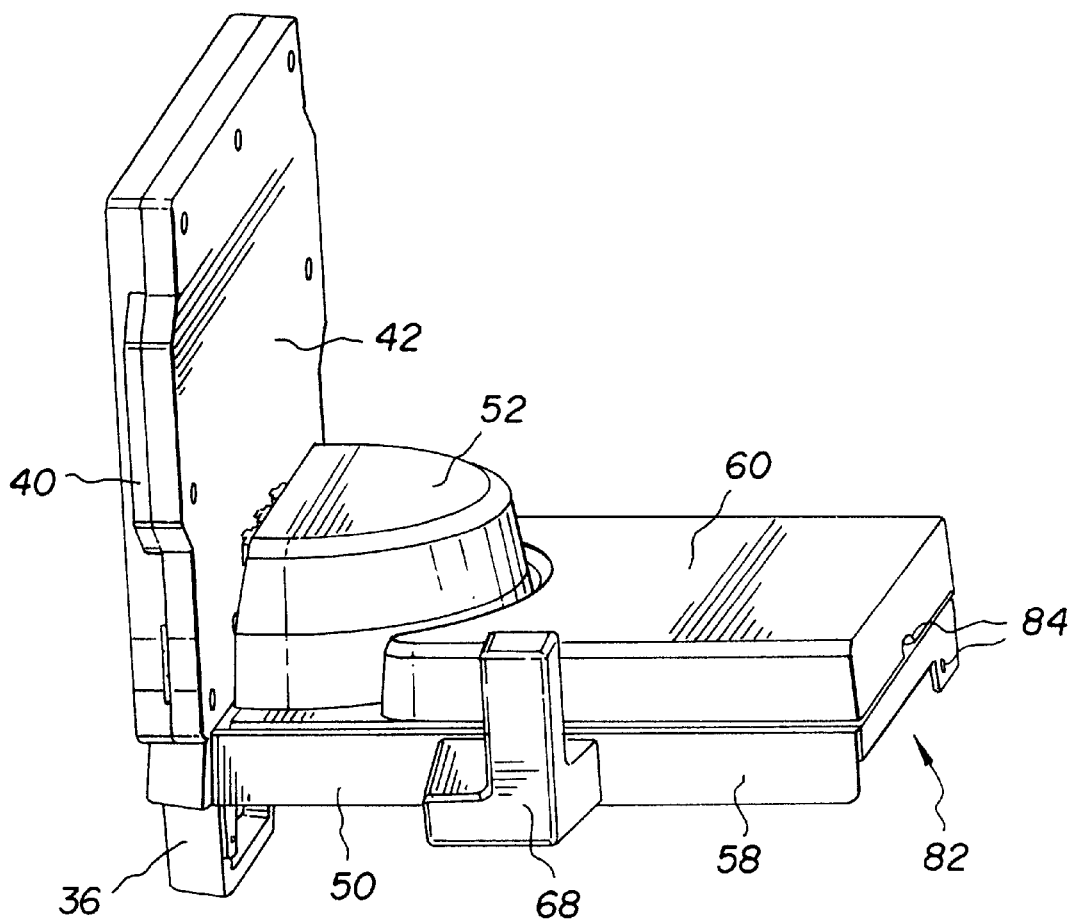
FIG. 12 is a rear perspective view of an alternative embodiment of the interface of FIG. 3.

As shown in an alternative embodiment in FIG. 12, a rear section of the platform 58 may include an opening 82 to accommodate passage of the slide table 70 therethrough as the platform 58 is moved forward. In addition, apertures 84 may be included for running electrical connections therethrough. Alternatively, the opening 82 may be used in conjunction with the apertures 84 to run cables therethrough for connecting the interface 10 with the electronic components of the copier 12.

While the disclosed articulating interface 10 is particularly shown and described herein with reference to the preferred embodiments, it is to be understood that various modifications in form and detail may be made without departing from the scope and spirit of the present invention. Accordingly, modifications such as any examples suggested herein, but not limited thereto, are to be considered within the scope of the present invention.

The invention has been described in detail with particular reference to certain preferred embodiments thereof, but it will be understood that variations and modifications can be effected within the spirit and scope of the invention.

PARTS LIST

- 10 interface
- 12 copier
- 14 top surface
- 16 pivoting section
- 18 arrow
- 20 arrow
- 22 stop
- 24 stylus
- 26 cable
- 28 screen
- 30 keypad
- 32 first axis
- 34 second axis
- 36 lower handle
- 38 lateral handle
- 40 lateral handle
- 42 back panel
- 44 frame
- 46 screws
- 48 flanges
- 50 tilt base
- 52 cap
- 54 peg
- 56 mounting hole
- 58 platform
- 60 back cover
- 62 central curved region
- 64 side surface
- 66 side surface
- 68 return arm
- 70 slide table
- 72 tracks
- 74 tilt plane
- 76 sloped surface
- 78 guide
- 80 swivel plane
- 82 opening
- 84 apertures

What is claimed is:

1. An articulating interface for mounting a control console on a machine, said articulating interface comprising:

a platform mounted for sliding movement, in three-dimensional space, to orient the control console in a plurality of longitudinal positions about a substantially vertical axis;

a base pivotably mounted on said platform for swivelling movement to a plurality of swivelled positions and a cap, having a sloped surface, mounted on said base;

a cover defining a central curved region adjacent a side of said base;

a hinge connecting said base and said control console for movement to a plurality of tilted positions about a substantially horizontal axis;

an interface support for mounting a control console connected to said platform; and a back panel for said control console, said back panel located adjacent to the sloped surface of said cap when said control console is attached to said interface support to abut the sloped surface upon tilting the control console there against, thereby limiting the range of selectable tilted positions.

2. The articulating interface of claim 1 wherein said platform defines an aperture therein;

a peg is disposed in the aperture of said platform; and said base is rotatably mounted on said peg and connected to the control console to swivel the control console in the plurality of selectable swivelled positions relative to said platform.

3. The articulating interface of claim 2 further comprising:

an arm mounted on the platform for engaging a protrusion of the machine to limit the selectable longitudinal positions.

4. The articulating interface of claim 2 wherein the cover includes a limiting surface for limiting the range of selectable swivelled positions.

* * * * *